Dec. 6, 1966 R. JURICH 3,290,135
GLASSWARE ORIENTING DEVICE ON GLAZING MACHINE
Filed Dec. 14, 1962 3 Sheets-Sheet 1
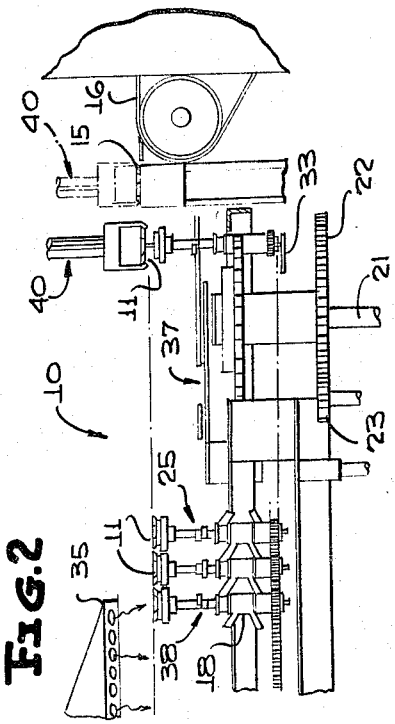
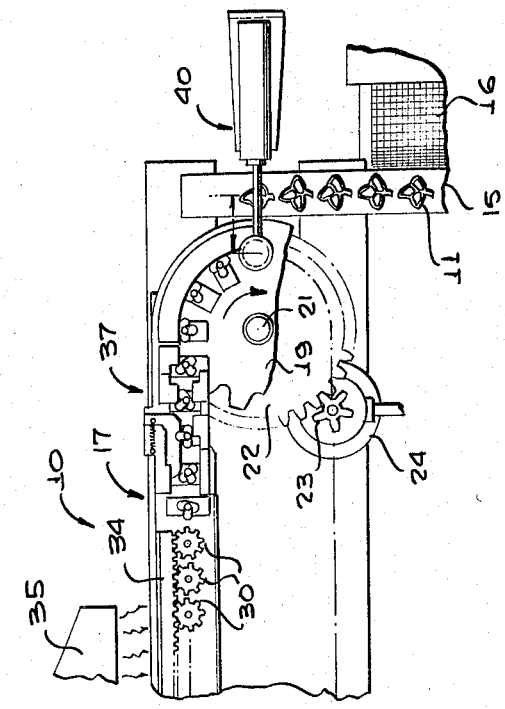
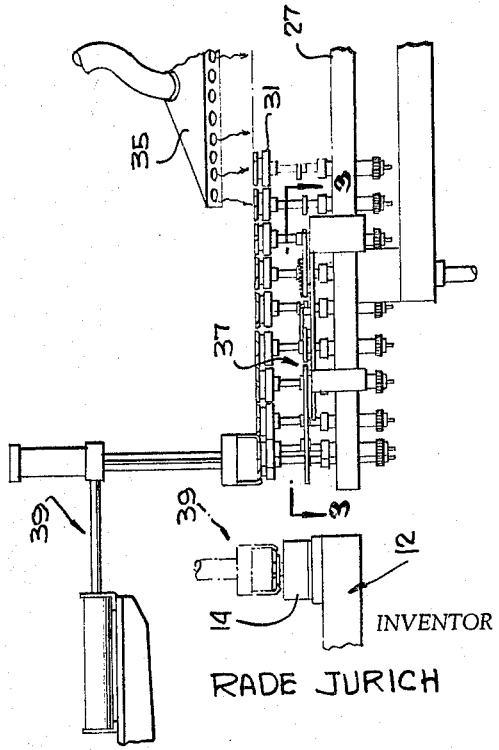
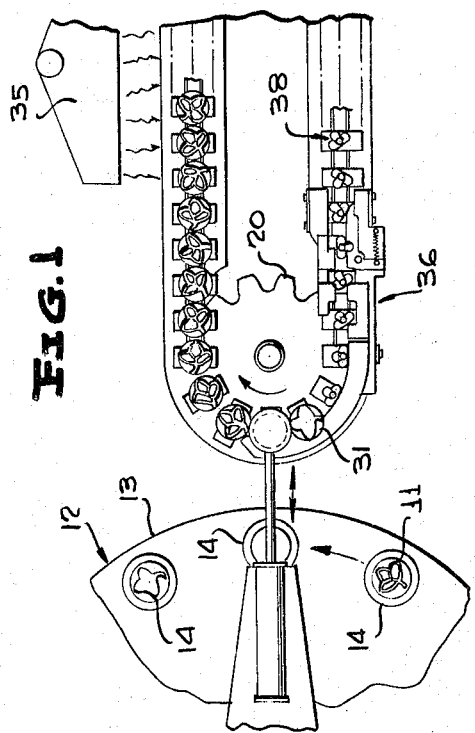
INVENTOR
RADE JURICH
BY
Mason, Porter, Diller & Stewart
ATTORNEYS

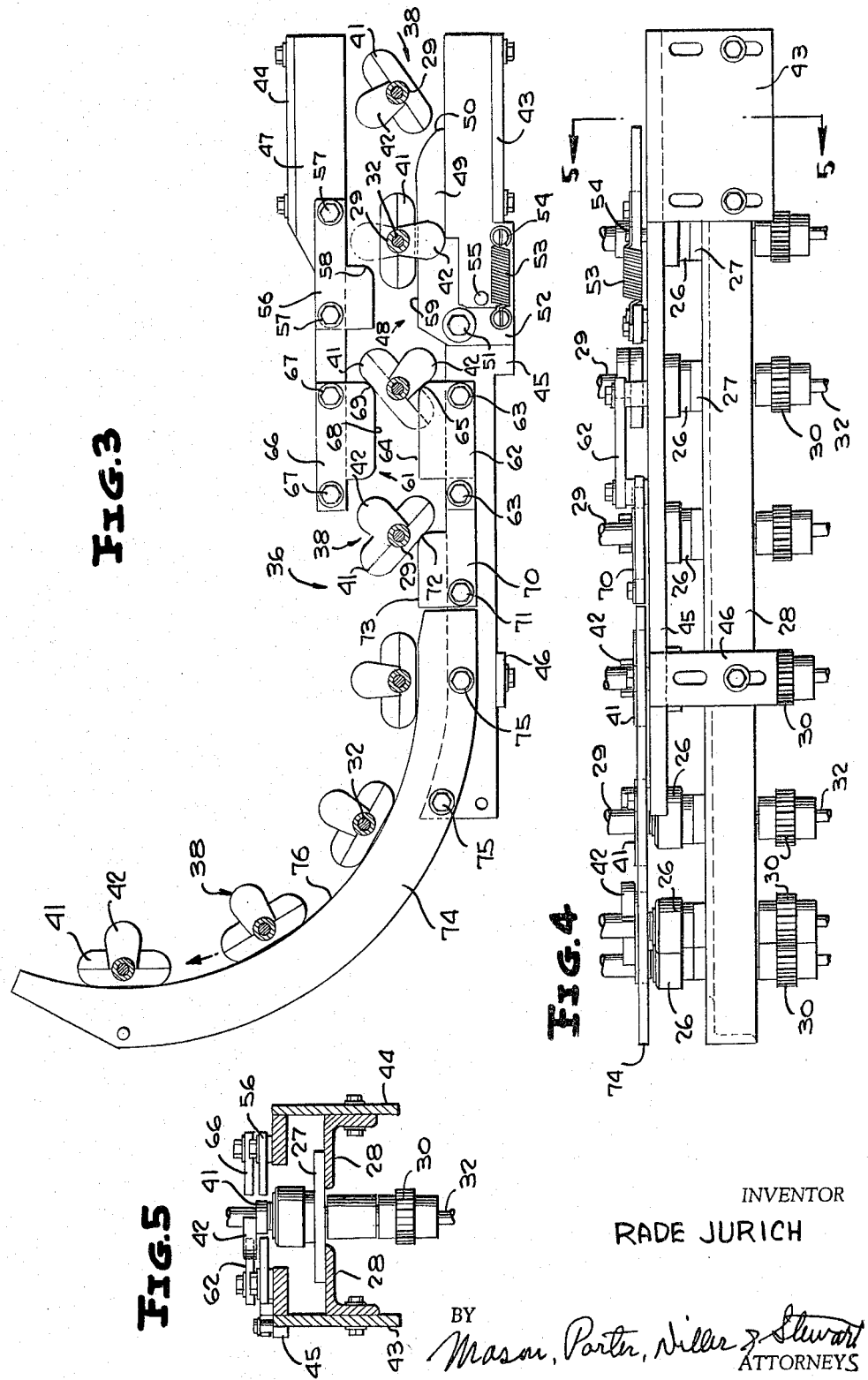

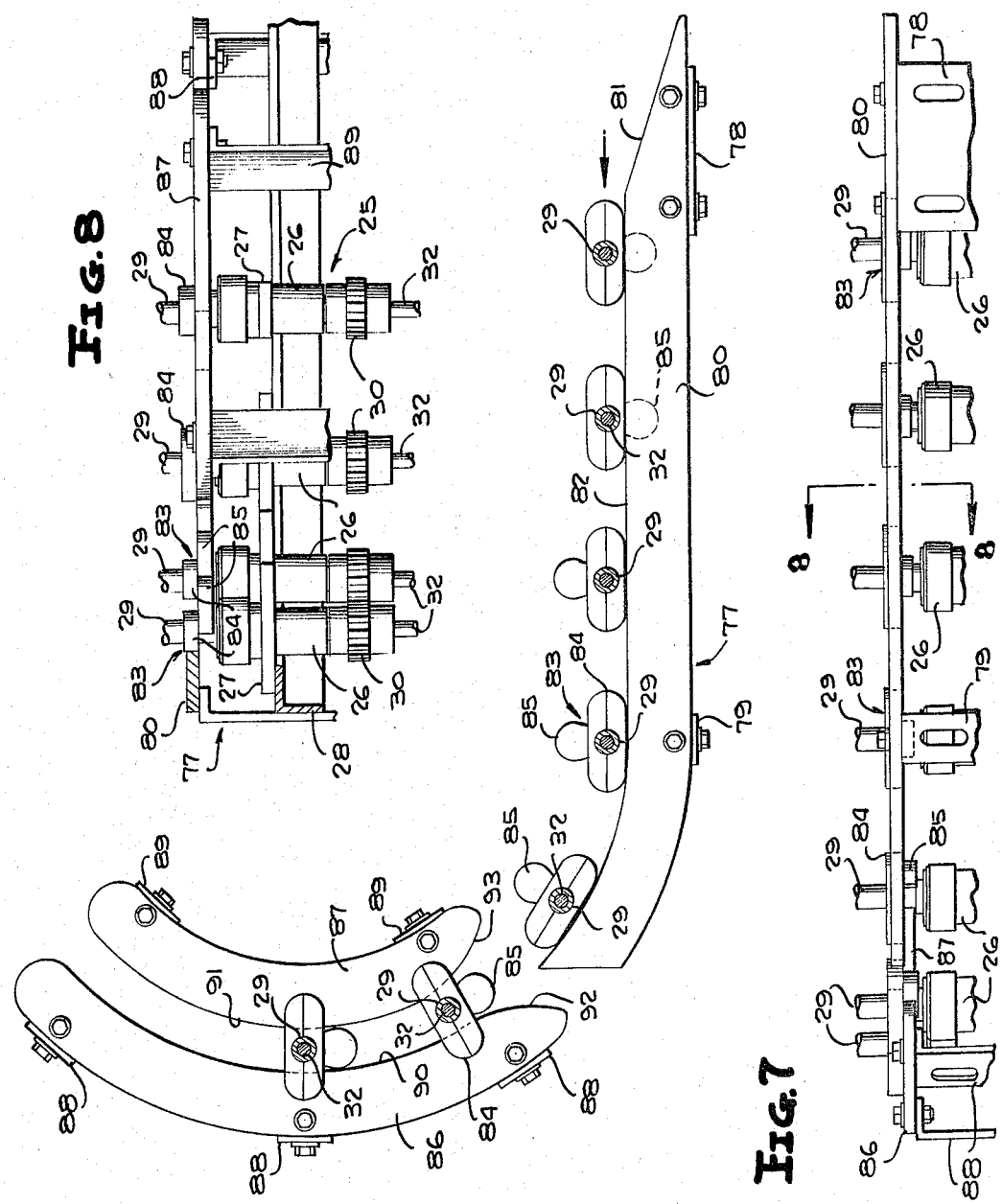

United States Patent Office 3,290,135
Patented Dec. 6, 1966

3,290,135
GLASSWARE ORIENTING DEVICE ON GLAZING MACHINE
Rade Jurich, Oak Lawn, Ill., assignor, by mesne assignments, to Brockway Glass Company, Inc., Brockway, Pa., a corporation of New York
Filed Dec. 14, 1962, Ser. No. 244,697
16 Claims. (Cl. 65—181)

This invention relates in general to new and useful improvements in article orienting devices, and more particularly relates to a novel orienting device particularly adapted for use on glassware glazing machines.

In the handling of articles, under certain conditions, articles are delivered to a conveyor in a particularly oriented relation and it is necessary for the conveyor to not only receive the articles in this specifically oriented relation, but to also deliver the articles to a take-away conveyor or the like in an oriented position. For example, in a glazing machine, it is necessary to provide an adequate support for the glassware article during the glazing operation, otherwise the article will slump out of shape during the glazing operation. The glassware articles are normally formed on a molding press and are delivered to a conveyor in a predetermined oriented relation. In accordance with this invention, a conveyor having a plurality of rotatable article supports is provided. The article supports are contoured to snugly receive the glassware articles and support the same during the glazing operation. It is, therefore, a primary object of this invention to provide a novel orienting device for orienting the supports of the conveyor prior to the supports reaching the point on their travel wherein the glassware articles are delivered thereto, whereby proper orientation of the supports with respect to the predetermined positions of the glassware articles is assured.

Another object of this invention is to provide in a glazing machine a conveyor having a plurality of article supports specifically contoured for receiving glassware articles disposed in a predetermined relation, the conveyor having associated therewith means for rotating the article supports whereby articles may be rotated to provide for an even heating and glazing during the glazing operation, and there being means associated with the conveyor for orienting the supports prior to the reception of the glassware articles to assure the proper seating of the glassware articles in the supports.

Still another object of this invention is to provide in a conveyor, as set forth above, a second orienting device for orienting the supports at the termination of the glazing operation whereby the glazed articles are oriented to a predetermined relation to assure the delivery thereof from the conveyor in such predetermined relation.

A still further object of this invention is to provide a novel orienting device for orienting a rotatable support and the like, the orienting device including a lug unit to be mounted on the rotatable support and a guide unit to be engaged by the moving lug unit to assure the orientation of the lug unit in a predetermined manner as it passes from the guide unit.

Another object of this invention is to provide a novel orienting device for orienting a moving rotatable member, the orienting device including a lug unit and a guide unit, the lug unit being fixedly securable to the support and the guide unit being mounted along the path of movement of the support, the lug unit including lugs lying in at least two planes and the guide unit including guide elements lying in the same two planes and being sequentially engageable with the lugs whereby the first one of the lugs is engaged and then the other to assure a predetermined lug positioning.

A further object of this invention is to provide a novel orienting device for use with a moving rotatable member for orienting that member in a desired relationship with respect to the direction of movement thereof as the member moves along its predetermined path, the orienting device including a lug unit formed of two lugs disposed in a T-shaped arrangement and including a first lug which may be considered the cross bar and the second lug which may be considered the stem, the two lugs being disposed in adjacent parallel planes, and there being associated with the lug unit a guide unit which includes separate guide elements engageable with the two lugs and lying in the planes of the respective lugs, the guide elements being so related with respect to the lugs and the paths of movement thereof whereby the cross bar lug is first engaged by its respective guide element and rotated to a position extending longitudinally of the direction of movement with the stem lug being disposed transversely of the direction of movement and facing towards either one of the two sides thereof, and the guide element associated with the stem lug being effective to rotate the lug unit 90 degrees with the stem lug in a trailing position and in the direction of movement.

A still further object of this invention is to provide a novel orienting device in accordance with the foregoing wherein a further lug element is provided for additional engagement with the cross bar lug for rotating the lug unit in a predetermined direction from the position wherein the stem lug is in trailing relation whereby the cross bar lug extends longitudinally of the direction of travel and the stem lug is directed to a predetermined side of the direction of travel.

Still another object of the invention is to provide an orienting device in accordance with the foregoing wherein at least one of the guide elements is spring loaded whereby it may deflect so as to prevent jamming by the respective lug.

With the above and other objects in view that will hereinafter appear, the nature of the invention will be more clearly understood by reference to the following detailed description, the appended claims and the several views illustrated in the accompanying drawings.

In the drawings:

FIGURE 1 is a plan view of a glazing machine in which the orienting device of this invention is utilized, intermediate portions of the glazing machine being broken away and only such details thereof being shown for an understanding of the invention.

FIGURE 2 is a front elevational view of the glazing machine of FIGURE 1 with parts broken away and schematically shown and shows further the details of the glazing machine and the orienting device.

FIGURE 3 is an enlarged fragmentary horizontal sectional view taken along the line 3—3 of FIGURE 2 and shows specifically the details of a plurality of the lug units and the relationship thereof with respect to one of the guide units.

FIGURE 4 is an enlarged fragmentary front elevational view of the guide unit and portions of the conveyor of the glazing machine and shows further the details of the relationship thereof.

FIGURE 5 is an enlarged fragmentary vertical sectional view taken along the line 5—5 of FIGURE 4 and shows the specific relationship of the lugs of one lug unit with respect to the guide elements of the guide unit.

FIGURE 6 is an enlarged fragmentary horizontal sectional view similar to FIGURE 3, and shows the details of a modified form of guide unit and the relationship thereof with respect to the lug units.

FIGURE 7 is an enlarged fragmentary front elevational view showing further the details of the guide unit of FIGURE 6.

FIGURE 8 is an enlarged fragmentary vertical sectional view taken along the line 8—8 of FIGURE 7, and shows specifically the relationship of the lug units with respect to the guide unit.

Referring now to the drawings in detail, reference is first made to FIGURES 1 and 2 wherein there is illustrated the details of a glazing machine in which the orienting device of this invention is incorporated. The glazing machine is generally referred to by the numeral 10 and is shown as being particularly adapted for receiving candy dishes of a leaf configuration. These candy dishes, which will be referred to hereinafter as glassware articles and identified by the numeral 11, are merely examples of glassware articles which may be handled by the glazing machine 10. The invention is not restricted to the particular shape of the glassware articles except for the fact that the invention is particularly directed to the proper orientation of the glassware article during the handling thereof in accordance with this invention.

At the left side of FIGURES 1 and 2, there is illustrated a press mold 12 which is illustrated as including a turret 13 carrying a plurality of molds 14. In each mold 14 there is formed in sequence a glassware article 11 which is to be glazed and then transferred to a conveyor belt 15 for further transfer to a lehr conveyor belt 16 which are shown at the right-hand side of FIGURES 1 and 2.

During the glazing operation, which will be broadly described hereinafter, it is necessary that the glassware articles 11 be supported otherwise when they are heated during the glazing operation, they will slump down and lose their molded shapes. Therefore, it is not possible to merely support the glassware articles 11 on flat supports during the glazing operation. In order that the glassware articles 11 may be properly supported and transported during the glazing operation, there is provided a conveyor which is generally referred to by the numeral 17. The conveyor 17 includes an endless belt or chain 18 which passes around a drive sprocket 19 and an idler sprocket 20. The drive sprocket 19 is carried by a drive shaft 21 to which there is secured in a conventional manner a drive gear 22 which is, in turn, driven by a gear 23 of a drive unit 24. The conveyor chain 18 carries a plurality of spindle units, each of which is referred to by the numeral 25. Each spindle unit 25 includes a housing 26 which is rigidly secured to links of the chain 18 and is moved thereby. Each housing 26 is provided with a horizontal support plate 27 which rides on a track 28 and serves to support the housing 26 in a predetermined horizontal plane. The housing 26 of each spindle unit 25 carries a rotatable spindle 29 which is hollow and which has secured to the lower end thereof a gear 30 for effecting rotation thereof. The upper end of each of the spindles 29 is provided with a glassware article support 31 which is particularly shaped for receiving and supporting the glassware article 11. The supports 31 are replaceable in accordance with the article being formed by the press mold 12. A glassware article lifting pin 32 extends through each of the spindles 29 and out through the lower end thereof for engagement with a lifting device 33 shown at the right-hand side of FIGURE 2 and which may be in the form of a fixed cam.

The conveyor 17 is provided with a fixed rack 34 along the run of the conveyor 17 extending between the press mold 12 and the take-away conveyor 15. The rack 34 is disposed in the plane of the gears 30 and is engaged by the gears 30 of the spindle assemblies 25 moving past the rack 34 so that the spindles 29 and the associated article supports are rotated during the movement of the spindle assemblies 25 along this portion of the conveyor 17. A plurality of glazing burners 35 are disposed generally along the length of the rack 34 for directing the necessary glazing flame towards the glassware articles 11 carried by the supports 31. It is necessary that the glassware articles be rotated during the glazing operation to obtain uniform glazing.

In view of the fact that the supports 31 are specially contoured for receiving and supporting the glassware articles 11, it will be readily apparent that the supports 31 must be exactly oriented in a predetermined position as they pass the point of transfer between the press mold 12 and the conveyor 17. It is also desirable that the glassware articles 11 be placed on the take-away conveyor 15 in a predetermined oriented relationship for transfer to the lehr conveyor 16. To this end, there is provided adjacent the press mold 12 and in advance thereof a guide unit, generally referred to by the numeral 36. An identical guide unit 37 is positioned in advance of and adjacent to the take-away conveyor 15. The guide units 36 and 37 form parts of an orienting device which also includes a lug unit, generally referred to by the numeral 38, carried by each of the spindles 29. The lug units 38 are cooperable with the guide units 36 and 37 to effect the desired orientation of the article supports 31. At this time it is pointed out that there is associated with the press mold 12 an article transfer device, generally referred to by the numeral 39. The article transfer device does not form part of this invention. However, it is to be understood that it will move the glassware article 11 from one of the molds 14 of the press mold 12 to one of the article supports 31 while maintaining the predetermined orientation of the glassware article. A similar article transfer device, generally referred to by the numeral 40 is provided adjacent the take-away conveyor 15 for removing the glassware article 11 which has been elevated by means of the lifting pin 32 and transferring the same to the take-away conveyor 15 while maintaining the orientation thereof.

Referring now to FIGURES 3, 4 and 5 in particular, it will be seen that each of the lug units 38 is formed of two lugs 41 and 42 which are disposed in a generally T-shaped arrangement with the lug 42 intersecting the center of the lug 41 at the center of the associated spindle 29 and the lug 41 being considered a cross bar lug while the lug 42 is considered to be a stem lug. The lug 42 rests upon the lug 41 and is thereby vertically offset relative thereto.

The guide unit 36, which is illustrated in FIGURES 3, 4 and 5, includes a pair of side plates 43 and 44 which are suitably secured to the track 28. The side plate 43 supports a horizontal plate 45 which is further supported by means of an upright support 46 which is also secured to the track 28. The side plate 44 supports a horizontal plate 47.

The guide unit 36 includes a first guide assembly, generally referred to by the numeral 48, for engaging the cross bar lugs 41 and initially positioning each lug unit 38 with the cross bar unit 41 disposed longitudinally of the direction of movement of the lug unit and with the stem lug 42 projecting to either side of the path of movement. The guide assembly 48 includes an elongated guide element 49 having a curved leading edge 50. The guide element 49 is mounted for pivotal movement about a vertical pin 51 and has an outwardly directed arm 52 to which there is connected a tension spring 53 which is anchored to the plate 45 by means of a pin 54. A suitable pin 55 carried by the plate 45 limits the swinging movement of guide element 49 by the spring 53.

The guide assembly 48 also includes a guide element 56 which is secured to the plate 47 by means of fasteners 57. The guide element 56 has a curved leading edge 58 which is spaced downstream of the leading edge 50 of the guide element 49. The guide elements 49 and 56 have opposed edges 59 and 60, respectively, which are disposed on opposite sides of and parallel to the path of movement of the spindle 29 and which are spaced apart a sufficient distance to permit the passage of the cross bar lug 41 therebetween. Due to the resilient mounting of the guide element 49, jamming of the cross bar lug 41 against the curved leading edge 50 is prevented.

From FIGURE 3 it will be readily apparent that when the lug unit 38 passes through the guide assembly 48, the cross bar lug 41 thereof must extend longitudinally of the direction of movement of the spindle 29 and the stem lug 42 extends to one side or the other of the path of movement and clears the guide assembly 48.

The guide unit 36 includes a second guide assembly generally referred to by the numeral 61. The guide assembly 61 is disposed in the plane of the stem lug 42 for engagement thereby. The guide assembly 61 includes a first guide element 62 which is secured to the horizontal plate 45 by means of fasteners 63 and which has a guiding edge 64 disposed parallel to the path of movement of the spindle 29 and a rounded leading edge 65.

The guide assembly 61 also includes a guide element 66 which is of a configuration similar to that of the guide element 62 and which is secured to the horizontal plate 47 by means of fasteners 67. The guide element 66 has a longitudinal guiding edge 68 spaced from and disposed parallel to the guiding edge 64 of the guide element 62. The guide element 66 also has a rounded leading edge 69.

It will be readily apparent from FIGURE 3 that when the lug unit 38 which has been initially oriented by the guide assembly 48 engages the guide assembly 61, should the stem lug 42 thereof be projected to the left as facing in the direction of travel, the stem lug 42 will engage the guide element 62 and be rotated in a counterclockwise direction so as to be aligned with the direction of travel and in a trailing position with respect to the cross bar lug 41. On the other hand, if the stem lug 42 is projected to the right, it will engage the guide element 66 and the lug unit 38 will be rotated in a clockwise direction until the stem lug 42 is in a trailing position along the path of movement. Thus, it will be readily apparent that irrespective of the direction to which the stem lug projects when it leaves the guide assembly 48, it will be rotated to a trailing position with respect to the cross bar lug and aligned with the path of travel of the lug unit by means of the guide assembly 61. At this time, the cross bar lug 41 extends transversely of the path of movement.

A third guide assembly, defined by a single guide element 70, is provided for engaging the cross bar lug 41 and further rotating the lug units. The guide element 70 is supported by the plate 45 and is secured thereto by means of at least one of the fasteners 63 and a fastener 71. The guide element 70 has a curved leading edge 72 and a guiding edge 73 which guide edge is disposed parallel to the direction of movement of the lug units 38. It will be readily apparent that the portion of the cross bar lug 41 projecting to the left from the spindle 29 will engage the guide element 70 to rotate the lug units 38 and the associated spindle 29 in a counterclockwise direction so that the cross bar lug 41 will be disposed parallel to the guiding edge 73 and thus longitudinally of the path of movement, and the stem lug 42 will project to the right. This is the desired oriented position of the lug unit 38 and the associated spindle 29.

A further guide element 74 is secured to the horizontal plate 45 by means of fasteners 75. The guide element 74 is a part of the third guide assembly and may be integrally formed with the guide element 70, if it is so desired. It is to be noted that the guide element 74 is arcuate in outline and is provided with an arcuate guiding edge 76 which conforms to the path of the lug units 38 as they pass around the respective ones of the sprockets 19 and 20.

From the foregoing, it will be readily apparent that irrespective of the orientation of a spindle 29 and its associated article support 31 at the time it approaches the guide unit 36 or the guide unit 37, which is identical with the guide unit 36, the associated lug unit 38 will so be engaged by the various guide elements so as to be alternatly rotated in a manner to assure the positioning of the lug unit and the associated spindle and article support to the desired oriented position.

Referring now to FIGURES 6, 7 and 8, it will be seen that there is illustrated a modified form of guide unit, generally referred to by the numeral 77, which may be utilized as a replacement for the guide units 36 and 37. The guide unit 77 is supported from the track 28 in the same general manner as described above with respect to the guide unit 36 and includes a side plate 78 and a further supporting plate 79 which serve to support an elongated guide element 80. The guide element 80 is provided with a tapered leading edge 81 and has a guiding edge 82 of which a part is straight and a part is curved and which is disposed in constant spaced relation to the path of movement of the spindles 29 at all times.

Each spindle 29 carries a lug unit, generally referred to by the numeral 83. The lug units 83, like the lug units 38, are generally T-shaped in outline and each lug unit 83 includes a cross bar lug 84 and a stem lug 85 with the stem lug 85 intersecting the cross bar lug 84 in the axis of the associated spindle 29. The lug units 83 differ from the lug units 38 in that the cross bar lugs 84 are disposed uppermost.

It is to be noted that as the lug unit 83 moves into engagement with the guide element 80, it engages the tapered leading edge 81 and is rotated to a position wherein the cross bar lug 84 is disposed longitudinally of the path of movement of the spindle 29 with the stem lug 85 projecting either to the right or to the left therefrom.

The guide unit 77 also includes a pair of guide elements 86 and 87 which are secured to the track 28 by means of suitable uprights 88 and 89, respectively. The guide elements 86 and 87 are arcuate in outline and the guide element 86 has a guiding edge 90 which is a continuation of the guiding edge 82 of the guide element 80. The guide element 87 has a guiding edge 91 which is disposed concentric with respect to the guiding edge 90. The guide elements 86 and 87 have curved leading edges 92 and 93, respectively.

The guide elements 86 and 87 are in the plane of the lugs 85. It is to be understood that when the lugs 85 approach the guide elements 86 and 87, they are at right angles to the desired positions thereof, and come into engagement with the leading edge 92 or the leading edge 93. The lugs 85, through their engagement with the leading edges 92 and 93 are rotated to trailing positions with respect to the lugs 84 so that the lugs 84 are disposed in transverse positions and the lugs 85 are in trailing positions extending generally along the path of movement of the spindle 29. Rotation of the lug units 83 and the corresponding spindles 29 out of the desired orientation is prevented by the spacing of the guide edges 90 and 91 which correspond substantially to the maximum width of each of the lugs 85.

From the foregoing, it will be readily apparent that the orienting device of this invention requires but a simple lug unit and a simple guide unit to assure the exact desired orientation of a spindle and its associated article support. In addition, although the lug unit and the guide unit are extremely simple, jamming thereof is eliminated. It is also to be understood that the orienting device is of a nature wherein it may be incorporated in existing apparatus, including an existing glazing machine to effect the necessary orientation of article supports of such apparatus.

Attention is also directed to the fact that although the invention has been illustrated in conjunction with only a candy dish of a specific configuration, the invention is not limited with respect to specific glassware configurations, but may be utilized in conjunction with any glassware shapes which must be maintained during a glazing operation.

Although only two preferred embodiments of the invention have been specifically illustrated and described herein, it is to be understood that minor modifications may be made in the disclosed orienting devices within the spirit and scope of this invention, as defined by the appended claims.

I claim:

1. An orientation assembly comprising a lug unit adapted to be attached to a moving member to be oriented and a guide unit positioned along a path of movement of the moving member, said lug unit including a first lug adapted to be oriented in a first direction and a second lug adapted to be oriented in a second direction which is angularly related relative to said first direction, said second lug lying in a plane disposed adjacent to and out of the plane of the first lug and being positioned relative to said first lug in the same relation as said second direction is to said first direction, said guide unit including a first guide assembly means lying in the plane of said first lug for engaging said first lug and turning said lug unit to position said first lug in said first direction, a second guide assembly means lying in the plane of said second lug for engaging said second lug in all positions thereof as determined by said first guide assembly means and turning said lug unit to a second position with said first lug in said second direction, and a third guide assembly means lying in the plane of said first lug for engaging said first lug to rotate said lug unit to a third position with said first lug oriented in the first direction and the second lug in the second direction.

2. The orientation assembly of claim 1 wherein said lugs are disposed at right angles to each other.

3. The orientation assembly of claim 1 wherein said lugs are disposed at right angles to each other, and said second lug intersects said first lug at a central portion thereof.

4. The orientation assembly of claim 1 wherein said lugs are disposed at right angles and each of said first and second guide assembly means defines a confined path aligned with the path of movement for said first and second lugs, respectively.

5. The orientation assembly of claim 1 wherein said first guide assembly means includes a spring loaded guide to prevent jamming of said lug unit at said first guide assembly means.

6. An orientation assembly comprising a lug unit adapted to be attached to a moving member to be oriented and a guide unit positioned along a path of movement of the moving member, said lug unit including a first lug adapted to be oriented in a first direction and a second lug adapted to be oriented in a second direction, said second lug extending laterally of said first lug and lying in a plane disposed adjacent to and out of the plane of the first lug, said first lug and said second lug and said first direction and said second direction being in generally right angular relation with said first lug extending to both sides of said second lug, said guide unit comprising first guide means for engaging said first lug and aligning said first lug with the path of movement and said second lug in a position transverse thereto, second guide means for engaging said second lug and aligning said second lug with the path of movement and in a trailing position, and third guide means for engaging said first lug for again aligning said first lug with the path of movement while rotating said second lug to the second direction.

7. An orientation assembly comprising a lug unit adapted to be attached to a moving member to be oriented and a guide unit positioned along a path of movement of the moving member, said lug unit including a first lug adapted to be oriented in a first direction and a second lug adapted to be oriented in a second direction which is angularly related to said first direction, said second lug lying in a plane disposed adjacent to and out of the plane of the first lug and being positioned relative to said first lug in the same relation as said second direction is to said first direction, said guide unit including a first guide assembly means lying in the plane of said first lug for engaging said first lug and turning said lug unit to position said first lug in said second direction, a second guide assembly means lying in the plane of said second lug for engaging said second lug and turning said lug unit to a second position with said first lug in said first direction and said second lug in said second direction.

8. An orientation assembly comprising a lug unit adapted to be attached to a moving member to be oriented, and a guide unit positioned along a path of movement of the moving member, said lug unit including first and second lugs disposed in a generally T arrangement with said lugs lying in adjacent planes and being adapted to be positioned with said first lug disposed transversely of the direction of movement and said second lug disposed along the direction of movement and in trailing relation to said first lug, said guide unit including a first guide means lying in the plane of said first lug for engagement by said first lug to rotate said lug unit to a position wherein said first lug is disposed along the direction of movement and said second lug is disposed transverse to the direction of movement and indiscriminately directed to one side of the path of movement of said lug unit, and second guide means lying in the plane of said second lug and disposed on opposite sides of the path of movement for rotating said lug unit to a position wherein said first lug is disposed transversely of the direction of movement and said second lug is disposed along the direction of movement and in trailing relation to said first lug.

9. The orientation assembly of claim 8 wherein said second guide means are elongated and extend along a predetermined path.

10. A conveying apparatus comprising an article receiving station and a spaced article delivery station, an endless conveyor extending between said stations, said conveyor having a plurality of rotatable article supports, first orienting means for said article supports adjacent said receiving station for orienting said article supports for alignment with articles received thereby, second orienting means for said article supports adjacent said delivery station for again orienting said article supports prior to the delivering of articles, said second orienting means including first and second guide elements disposed on opposite sides of the path of movement of said rotatable article supports, and means intermediate said stations for rotating said article supports.

11. A conveying apparatus comprising an article receiving station and a spaced article delivery station, an endless conveyor extending between said stations, said conveyor having a plurality of rotatable article supports, first orienting means for said article supports adjacent said receiving station for orienting said article supports for alignment with articles received thereby, second orienting means for said article supports adjacent said delivery station for again orienting said article supports prior to the delivering of articles, and means intermediate said stations for rotating said article supports, said first and second orienting means including a lug unit connected to each of said article supports, and first and second guide units, said second guide unit including first and second guide elements disposed on opposite sides of the path of movement of said rotatable article supports.

12. A conveying apparatus comprising an article receiving station and a spaced article delivery station, an endless conveyor extending between said stations, said conveyor having a plurality of rotatable article supports, first orienting means for said article supports adjacent said receiving station for orienting said article supports for alignment with articles received thereby, second orienting means for said article supports adjacent said delivery station for again orienting said article supports prior to the delivering of articles, and means intermediate said stations for rotating said article supports, said first and second orienting means including a lug unit connected to each of said article supports, and first and second guide units, each lug unit including first and second lugs disposed in a generally T arrangement with said lugs lying in adjacent planes and being adapted to be positioned with said first lug disposed transversely of the direction of movement of said lug units and said second lug disposed along the direction of movement and in trailing relation to said first lug, each guide unit including a first guide means lying in the plane of said first lug for engagement by said first lug to rotate said lug unit to a position wherein said first lug is disposed along the direction of movement and said second lug is disposed transverse to the direction of movement and indiscriminately directed to one side of the path of movement of said lug unit, and second guide means lying in the plane of said second lug and disposed on opposite sides of the path of movement for rotating said lug unit to position said lug unit with said first lug disposed transversely of the direction of movement and said second lug disposed along the direction of movement and in trailing relation to said first lug.

13. The conveying apparatus of claim 12 wherein said second guide means are elongated and extend along the path of movement of said supports at said stations.

14. The conveying apparatus of claim 12 together with a third guide for engaging said first lug and further rotating each lug unit to a position wherein said first lug is disposed longitudinally of the path of movement and said second lug is disposed transversely of the path of movement in a predetermined direction.

15. The conveying apparatus of claim 10 wherein said article supports are contoured in accordance with the article to be seated therein to maintain the shape of the article during transport.

16. The conveying apparatus of claim 10 wherein said conveyor is part of a glassware glazing machine and glazing burners are disposed adjacent said article support rotating means.

References Cited by the Examiner

UNITED STATES PATENTS

| | | | |
|---|---|---|---|
| 1,515,793 | 11/1924 | Sanford et al. | 65—284 |
| 1,696,294 | 12/1928 | Crawford et al. | 198—33 X |
| 1,823,574 | 9/1931 | Rowe | 198—33 X |
| 2,209,252 | 7/1940 | Stewart et al. | 65—284 X |
| 2,779,453 | 1/1957 | Lippert et al. | 198—33 |
| 2,886,165 | 5/1959 | Eger | 198—33 X |

DONALL H. SYLVESTER, *Primary Examiner.*

A. D. KELLOGG, *Assistant Examiner.*